United States Patent [19]
Negron

[11] Patent Number: 5,403,042
[45] Date of Patent: Apr. 4, 1995

[54] TRANSMISSION FLUID COOLER LINE FLUSHING ADAPTER AND METHOD

[76] Inventor: Steve A. Negron, 3694 Seagrape Dr., Winter Park, Fla. 32792

[21] Appl. No.: 164,323

[22] Filed: Dec. 9, 1993

[51] Int. Cl.$^6$ .............................................. F16L 25/00
[52] U.S. Cl. ...................................... 285/12; 285/158; 285/174; 29/469; 134/22.18; 134/166 R
[58] Field of Search ............... 285/158, 189, 190, 12; 134/22.18, 166 R; 29/469

[56] References Cited

U.S. PATENT DOCUMENTS

| | | | |
|---|---|---|---|
| 3,384,394 | 5/1968 | O'Connor | 285/190 |
| 4,073,512 | 2/1978 | Vian et al. | 285/12 |
| 4,142,741 | 3/1979 | Fiala | 285/190 X |
| 4,775,174 | 10/1988 | Bona | 285/190 |
| 5,011,192 | 4/1991 | Campo | 285/190 X |

FOREIGN PATENT DOCUMENTS 4337189  11/1992  Japan ......................... 285/158
2259347  3/1993  United Kingdom ......... 285/158

OTHER PUBLICATIONS

Trans-Tool brochure, Hayden Trans-Tool, 1990.

*Primary Examiner*—Dave W. Arola
*Attorney, Agent, or Firm*—Warren L. Franz

[57] ABSTRACT

An adapter (70) for connecting a banjo fitting (44) of a transmission oil cooling line (21) to a flushing unit or cooler fixture hose (73) has a banjo nut (56') joined to a hollow tubing (71). Tubing (71) terminates in a flared end (72) which passes through an axial bore (45) of banjo fitting (45) and is secured by a radiator clip (74) within hose (73). Bore (44) has front and rear openings surrounded by ring-shaped external surfaces (46). A sealing nut (75) threads onto a threaded shank portion (57) of banjo nut (56') to establish an "O"-ring (76) seal against one surface (46) about tubing (71), and to seal the other surface (46) with a washer (63) at an underside of a head (58) of banjo nut (56').

6 Claims, 2 Drawing Sheets

TRANSMISSION FLUID COOLER LINE FLUSHING ADAPTER AND METHOD

This invention relates to an adapter and method for flushing out a cooler line of a transmission fluid cooling system; and, in particular, to an adapter and method for connecting a banjo fitting to standard fittings of conventional oil cooler and line flusher equipment.

BACKGROUND OF THE INVENTION

Transmission fluid (viz. oil), especially of automatic transmissions, develops considerable heat build-up during the operation of a motor vehicle. For this reason, oil cooling systems are provided which pump transmission oil by means of cooling lines, out from the transmission housing through a transmission oil cooler tank, which may be an auxiliary unit or an integral part of the radiator of a water cooling system. The cooler core includes one or more finned tubes, located so air passing through the radiator and neighboring circulating engine coolant will cool the oil. Metal lines connect transmission outlet and inlet ports to cooler inlet and outlet ports.

Transmission oil is drained and replaced, and the cooling system flushed, when the transmission is serviced and also periodically as a part of good motor vehicle maintenance practice. For this purpose, equipment such as the Hayden Trans-Tool T-1090-HD oil cooler and line flusher can be employed. Such equipment comes with hoses and fittings for attachment to standard 5/16" hex nut, factory vehicle oil cooling system fittings. An adapter such as the Hayden Trans-Tool HSK-250 Quick-Connect ™ coupler (U.S. Pat. No. 4,073,512) can be used for connection of 5/16" factory cooler fittings, male and female, to hoses of conventional flushers, without the need to cut through metal lines. However, no means exists to connect the hoses of the flusher to metal lines terminating in a banjo-style fitting.

SUMMARY OF THE INVENTION

The present invention provides an adapter and method for connecting a metal cooler transmission line having a banjo fitting to standard hoses of conventional line flusher equipment. The same device and method can be used to connect an auxiliary oil cooling system using already present banjo fitting lines.

BRIEF DESCRIPTION OF THE DRAWINGS

Embodiments of the invention have been chosen for purposes of illustration and description, and are shown in the accompanying drawings, wherein.

Throughout the drawings, like elements are referred to by like elements.

DETAILED DESCRIPTION OF PREFERRED EMBODIMENTS

Figure 1:
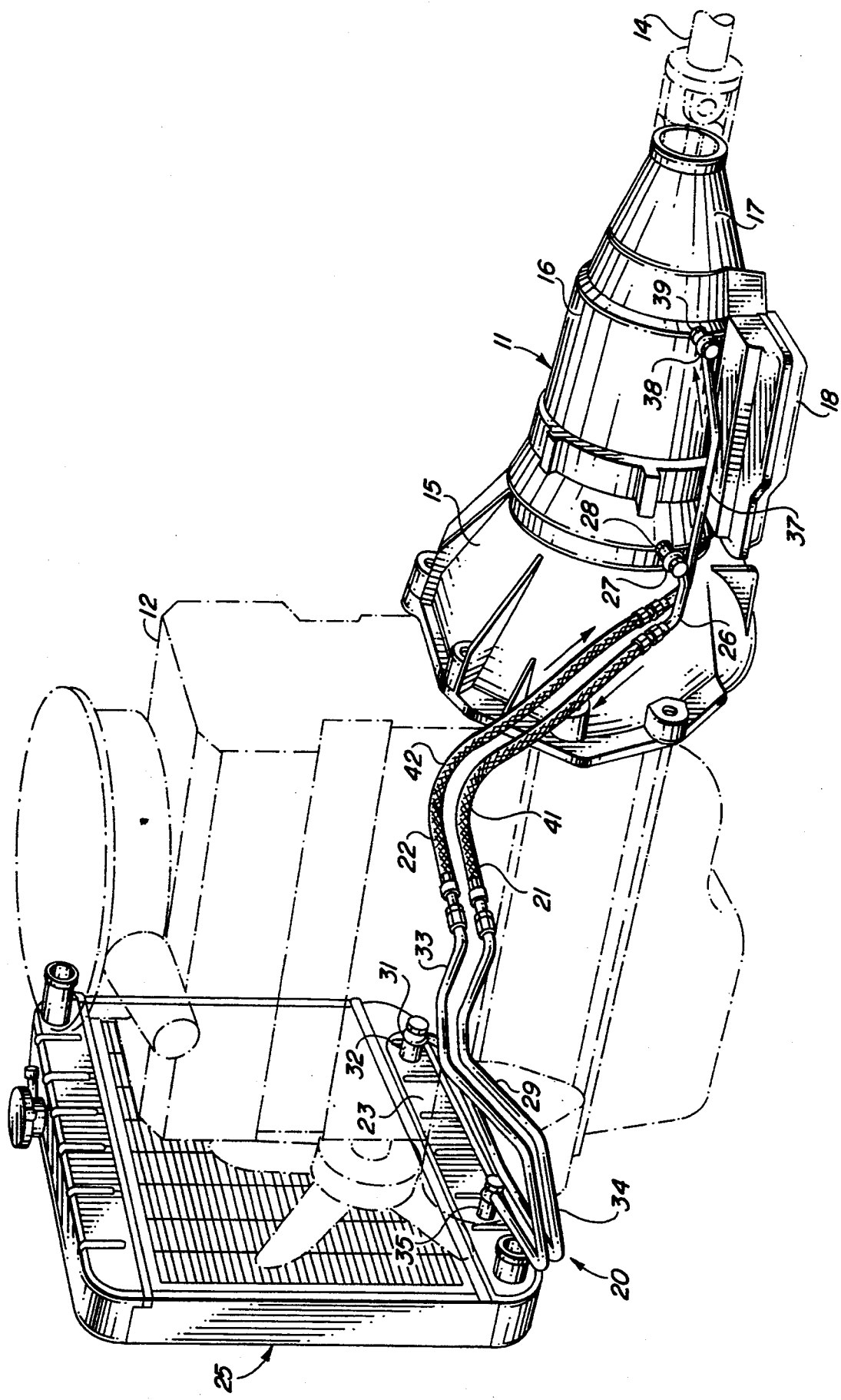
FIG. 1 is a view of a motor vehicle transmission oil cooling system employing cooler lines having banjo fittings.

FIG. 1 shows an automatic transmission 11 (viz. transaxle) connected between the output shaft of an engine 12 (dot-dashed lines) and a drive shaft 14. In accordance with conventional teachings, transmission 11 has a housing comprising a front converter portion 15, a central case 16, a rear extension 17 and a pan 18. Front converter portion 18 is doughnut-shaped and houses impeller or pump, turbine and stator components of a torque converter. Case portion 16 houses clutches, gears and bands. Extension portion 17 supports the front end of output shaft 14. Oil pan 18 acts as a reservoir for transmission fluid which fills front converter portion 15.

Friction occurring during operation of the torque converter, heats the oil which is cooled by pumping through an oil cooling system 20. System 20 comprises cooler lines 21, 22 and a cooler tank 23. Tank 23 may be integrated into the structure of a conventional engine coolant radiator 25, as shown, or may be supplied as a separate auxiliary radiator unit.

Cooler line 21 is an oil outlet line, including a metal tube portion 26 with a hollow interior bore having an inlet end 27 connected to an oil outlet port 28 of transmission 11 to receive heated oil from the converter. Line 21 also includes a metal tube portion 29 with a hollow interior bore having an oil outlet end 31 connected to an oil inlet port 32 of tank 23, to deliver the heated oil to cooling tubes of tank 23. Cooler line 22 is an oil inlet line, including a metal tube portion 33 with a hollow interior bore having an inlet end 34 connected to receive cooled oil from an oil outlet port 35 of cooler 23, and a metal tube portion 37 with a hollow interior bore having an outlet end 38 connected to deliver the cooled oil to an oil inlet port 39 of transmission 11 for delivery to the pan 18. Circulation through lines 21, 22 and cooler 23 is effected in the directions indicated by the arrows in FIG. 1. The portions 26, 29 and 33, 37 may be different parts of the same tube, or may be different tubes connected by flexible rubber hoses 41, 42, as shown.

Figure 2:
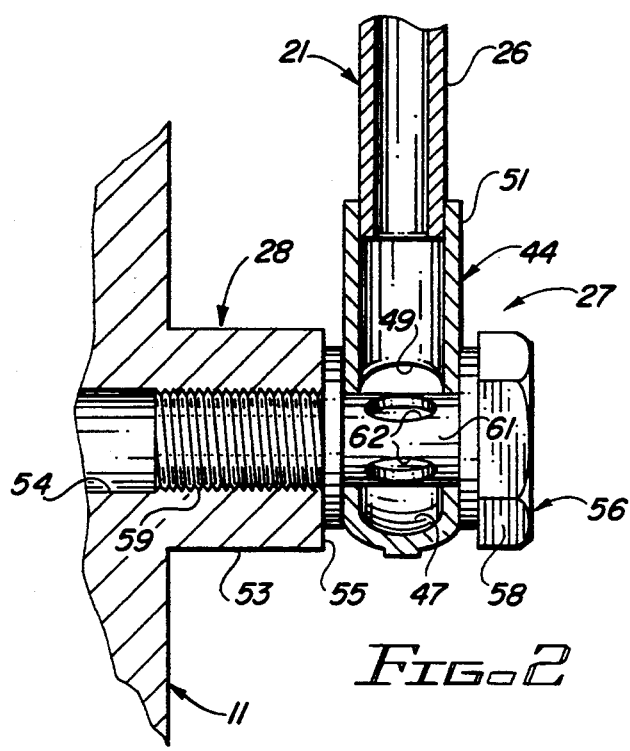
FIG. 2 is a section view, showing details of connection of a cooler line of FIG. 1.
Figure 3:
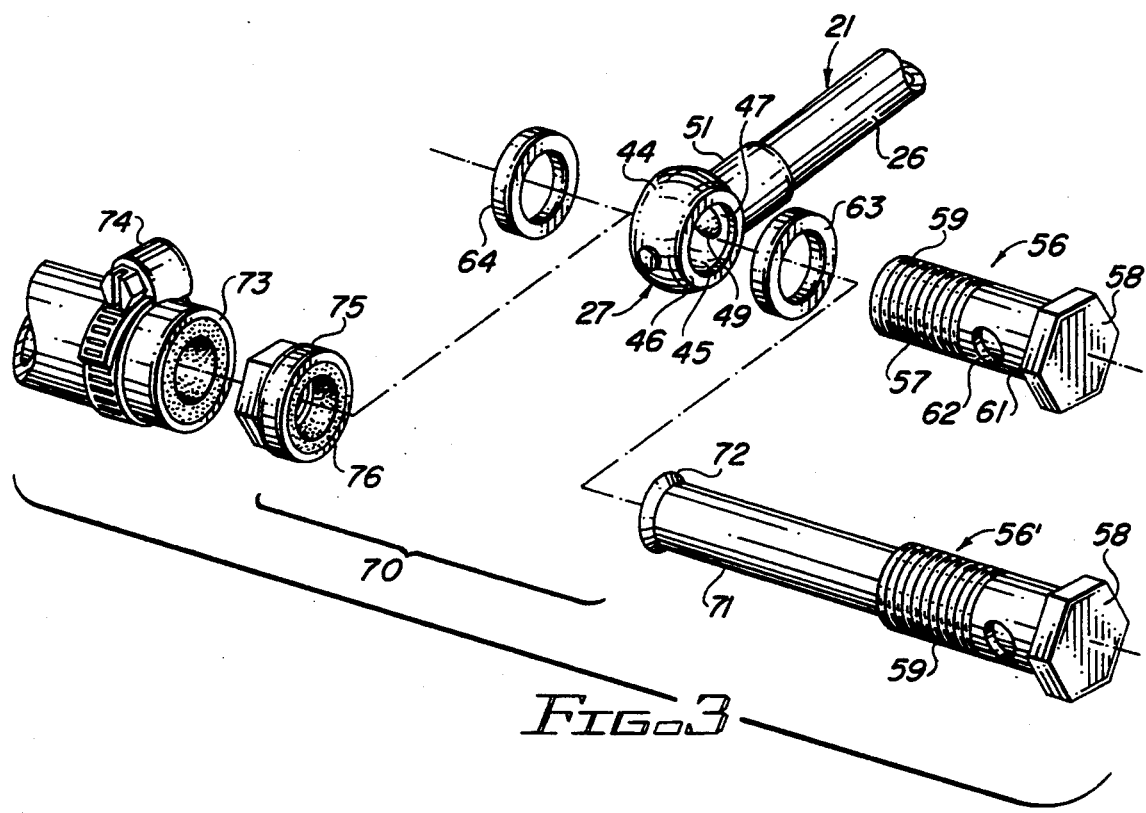
FIG. 3 is an exploded view showing connection of an adapter in accordance with the invention, for purposes of flushing out one of the cooler lines.

One or more of the ends 27, 31, 34, 38 may take the form of a banjo fitting 44, shown in FIGS. 2 and 3. Fitting 44 comprises a hollow toroidal structure having an axial bore 45 with front and rear openings surrounded by external ring-shaped planar coaxial surfaces 46, and an internal contour defining an annular hollow region 47 into which a radial bore 49 opens. A hollow tubular sleeve 51 projects radially outward, coaxial with the opening of bore 49, to form a transition between opening 49 and the main hollow cylindrical structure of metal tube portion 26.

Oil outlet port 28 of transmission 11 includes a raised cylindrical portion 53 having a threaded axial bore 54 and a radially directed, ring-shaped planar external surface 55 through which bore 54 opens. Connection between banjo fitting 44 and bore 54 is accomplished by means of a banjo bolt 56. Bolt 56 includes a hollow, bored-out shank portion 57 and a hexagonal cross-shaped head 58. Shank 57 includes an externally-threaded distal end 59 and an unthreaded proximal end 61. End 61 includes three 120° angularly-spaced radial bores 62 which communicate the shank axial bore exteriorly. The undersurface of head 58 is radially planar.

Leakproof connection of end 27 of line 21 to transmission oil outlet port 28 is achieved as shown in FIG. 2 by passing shank 57 of bolt 56 through the opening 45 of banjo fitting 44 into threading engagement with bore 54 of bushing 53. Flat circular washers 63, 64 are inserted intermediate fitting 44 and the underside of head 58 and surface 55 of bushing 53, respectively. When bolt 56 is threaded tightly into bore 54, oil is communicated through the central hollow of shank 57, out through openings 62, through opening 49 and into the interior of metal tube 26.

In accordance with the invention, cutting or disassembling of coolant line 21 is unnecessary for flushing using conventional flushing equipment. Instead, an adapter 70 (FIG. 3) is used. Adapter 70 comprises a banjo bolt 56' which has been modified by adding a length of 5/16" metal hollow tubing 71, with a flared terminal end 72, coaxially into the bore at shank distal end 59. Tubing 71 may be similar to the tubing employed in the adapter addressed by U.S. Pat. No. 4,073,512, which has a flared end. The flared end of tubing 71 can be used for mating the coupler within an end 73 of a conventional flushing unit or cooling fixture hose, by means of a radiator hose clip 74. Adapter 70 also includes a sealing member 75, in the form of an internally threaded nut having a proximal end "O"-ring or other circumferential sealing ring member 76.

In operation, bolt 56 is unscrewed from bushing 53, and replaced by modified bolt 56', which is passed through washer 63 and the bore of banjo fitting 44. Sealing nut 75 is then threaded over the threaded shank portion 59, with seal 76 engaging the adjacent surface 46 of banjo fitting 44. In this manner, the seal at the inner end of fitting 44 remains accomplished by tight engagement of surface 46, washer 63 and the underside of head 58. However, the seal at the other surface 46, which was previously accomplished by engagement of surface 46 with washer 64 and outer surface 55 of bushing 53, is accomplished by seal 76 which seals around the external cylindrical surface of tube 71 and against the surface 46.

The invention thus provides a mechanism whereby a metal hose having a banjo fitting 44 can be flushed by direct engagement with a hose of a conventional flushing unit, connected for installation of auxiliary cooler, or the like, all without the need to sever the line.

Those skilled in the art to which the invention relates will appreciate that other substitutions and modifications can be made to the described embodiments, without departing from the spirit and scope of the invention as described by the claims below.

What is claimed is:

1. Apparatus for connecting a cooler line of a transmission cooling system to a hose; said cooler line including a metal tube portion with a hollow interior bore and an end having a banjo fitting, said banjo fitting comprising a hollow toroidal structure with an axial bore having opposite openings surrounded respectively by first and second external ring-shaped coaxial surfaces and an internal contour defining an annular hollow region into which the tube portion interior bore opens radially; and said adapter comprising:

a bolt having a shank with a hollow interior bore and a head; said shank including a hose attachment portion having an outwardly flared open end, a fitting attachment portion adjacent said head, and an externally threaded portion intermediate said hose attachment and fitting attachment portions; said fitting attachment portion including at least one radial bore which communicates said shank internal bore exteriorly; and said head including an undersurface facing said shank; said bolt being dimensioned and configured so that said bolt can be passed through said banjo fitting axial bore to bring said fitting over said fitting attachment portion; and said flared open end being dimensioned and configured for receiving a hose in mating engagement over said hose attachment portion, for fluid communication of said hose with said cooling line interior bore through said shank interior bore, said fitting attachment at least one radial bore and said fitting annular hollow region;

means associated with said bolt for bringing said head undersurface into sealing interaction with said fitting first surface when said fitting is brought over said fitting attachment portion;

a sealing member comprising an internally threaded nut having an end including a sealing element; said sealing member being dimensioned and configured so that said nut can be brought over said flared hose attachment portion into threaded engagement with said shank externally threaded portion with said sealing element in sealing interaction with said fitting second surface when said head undersurface and said fitting first surface are in sealing interaction; and means for sealingly retaining the hose on said hose attachment portion.

2. Apparatus for connecting a cooler line of a transmission cooling system to a hose; said cooler line including a metal tube portion with a hollow interior bore and an end having a banjo fitting, said banjo fitting comprising a hollow toroidal structure with an axial bore having opposite openings surrounded respectively by first and second external ring-shaped coaxial surfaces and an internal contour defining an annular hollow region into which the tube portion interior bore opens radially; and said adapter comprising:

a banjo bolt having a shank with a hollow interior bore and a head; said shank including an externally threaded distal end portion and an unthreaded proximal end portion; said proximal end portion including angularly spaced radial bores which communicate said shank internal bore exteriorly; and said head including an undersurface facing said shank;

a length of metal tubing having a hollow interior bore, an open first end joined coaxially to the bolt shank distal end portion and communicating the bolt interior bore with the tubing interior bore, and an open second end which is outwardly flared; said bolt and tubing being dimensioned and configured so that said joined bolt shank and flared tubing can be passed through said banjo fitting axial bore to bring said fitting over said shank proximal end portion; and said flared tubing second end being dimensioned and configured for receiving a hose in mating engagement over said tubing, for fluid communication of said hose with said cooling line interior bore through said tubing and shank interior bores, said proximal end portion radial bores and said fitting annular hollow region;

means associated with said bolt for bringing said head undersurface into sealing interaction with said fitting first surface when said fitting is brought over said shank proximal end portion;

a sealing member comprising an internally threaded nut having an end including a circumferential sealing ring; said sealing member being dimensioned and configured so that said nut can be brought over said flared tubing into threaded engagement with said shank distal end portion with said sealing ring in sealing interaction with said fitting second surface when said head undersurface and said fitting first surface are in sealing interaction; and means for sealingly retaining the hose on said tubing.

3. A method for connecting a cooler line of a transmission cooling system to a hose, said cooler line including a metal tube portion with a hollow interior bore and an end having a banjo fitting, said banjo fitting comprising a hollow toroidal structure with an axial bore having opposite openings surrounded respectively by first and second external ring-shaped coaxial surfaces and an internal contour defining an annular hollow region into which the tube portion interior bore opens radially; said method comprising the steps of:

providing a bolt having a shank with a hollow interior bore and a head; said shank including a hose attachment portion having an outwardly flared open end, a fitting attachment portion adjacent said head, and an externally threaded portion intermediate said hose and fitting attachment portions; said fitting attachment portion including at least one radial bore which communicates said shank internal bore exteriorly; and said head including an undersurface facing said shank;

providing a sealing member comprising an internally threaded nut having an end including a sealing element providing a sealing means adjacent said undersurface;

passing said bolt through said banjo fitting axial bore to bring said fitting over said fitting attachment portion with said head undersurface in sealing interaction with said fitting first surface through said sealing means;

bringing said nut over said bolt attachment portion into threaded engagement with said shank externally threaded portion with said sealing element in sealing interaction with said fitting second surface; and attaching a hose in mating engagement over said hose attachment portion, to fluidly communicate said hose with said cooling line interior bore through said shank interior bore, said fitting attachment at least one radial bore and said fitting annular hollow region.

4. A method as in claim 3, wherein said method of providing a sealing means comprises the steps of providing a circular washer; and inserting said washer over said bolt to a position intermediate said fitting first surface and said head undersurface.

5. A method as in claim 3, wherein said cooler line banjo fitting is initially connected to a transmission by a banjo bolt passed through said banjo fitting into threaded engagement with said transmission; and said method further comprises the steps of disconnecting said banjo fitting from said transmission by unthreading said banjo bolt from said transmission, and removing said banjo bolt from said banjo fitting; and wherein, in said passing step, said bolt is inserted into said banjo fitting in place of said banjo bolt.

6. A method as in claim 5, wherein a washer is initially inserted over said banjo bolt to a position adjacent one of said fitting first and second surfaces; and wherein said method further comprises removing said washer when said banjo bolt is removed, wherein said method of providing a sealing means comprises inserting said washer over said bolt to a position intermediate said fitting first surface and said head undersurface.

* * * * *